United States Patent [19]

Filbert, Jr. et al.

[11]  3,995,901

[45]  Dec. 7, 1976

[54] ENERGY-ABSORBING SYSTEMS

[75] Inventors: William C. Filbert, Jr.; Robert D. Souffie, both of Wilmington, Del.; Richard M. Turner, Wallingford, Pa.

[73] Assignee: E. I. DuPont de Nemours and Company, Wilmington, Del.

[22] Filed: May 20, 1975

[21] Appl. No.: 579,150

Related U.S. Application Data

[63] Continuation-in-part of Ser. No. 482,790, June 24, 1974, abandoned, which is a continuation-in-part of Ser. No. 383,251, July 27, 1973, abandoned.

[52] U.S. Cl. .............................. 293/88; 267/140; 267/153
[51] Int. Cl.$^2$ ......................................... B60R 19/06
[58] Field of Search ................ 293/71 R, 71 P, 88; 114/219; 267/63 R, 140, 141, 153

[56]  References Cited

UNITED STATES PATENTS

| 2,727,738 | 12/1955 | Lindley | 267/153 |
| 3,335,689 | 8/1967 | Hein | 114/219 |
| 3,555,832 | 1/1971 | Narabu | 114/219 |
| 3,694,018 | 9/1972 | Levering | 293/88 |
| 3,722,876 | 3/1973 | Schwenk | 293/88 |
| 3,734,557 | 5/1973 | McKenzie | 267/140 |
| 3,897,095 | 7/1975 | Glance | 267/140 |

FOREIGN PATENTS OR APPLICATIONS

| 851,152 | 10/1958 | United Kingdom | 267/63 R |

*Primary Examiner*—Robert W. Saifer

[57]  ABSTRACT

An energy-absorbing device suitable as an automobile bumper using sinuous (corrugated), elastomeric ribs, which can be either attached to a connecting member at one end and unattached at the other end or unattached at both ends. These ribs buckle in a direction normal to the impact force and modulate that force.

12 Claims, 10 Drawing Figures

FORCE/DEFLECTION CURVE

ENERGY-ABSORBING SYSTEMS

CROSS-REFERENCE TO RELATED APPLICATIONS

This is a continuation-in-part of our application, Ser. No. 482,790, filed June 24, 1974, which is a continuation-in-part of our application, Ser. No. 383,251, filed July 27, 1973, both now abandoned.

BACKGROUND OF THE INVENTION

This invention relates to a novel energy-absorption device useful, for example, in the construction of vehicle bumpers or other applications requiring buffering against dynamic impact.

Energy-absorbing crash protection systems have within recent years assumed an important position in the automobile industry, especially because of the development of certain criteria and adoption of certain standards by the U.S. Department of Transportation. While the present goal of the Department of Transportation is to require automobile manufacturers to equip cars with bumpers capable of absorbing collision impact at a speed of up to 5 mph, it can be expected that these requirements will be gradually raised to cover more realistic collision speeds.

The present trend in automobile bumper construction includes the use of more steel, the resulting bumpers being quite heavy and expensive; of hydraulic shock absorbers, which function very well in longitudinal collisions but tend to lose their effectiveness in lateral or angular collisions; of rubber inserts in steel bumpers, which do offer a certain degree of additional protection at an added cost; and of polyurethane foam pads placed between the car body and the steel bumper.

An effective energy-absorbing device should be capable of yielding on impact and recovering, either partially or completely, after the impact. It would thus appear that simply making bumpers of heavier steel and with heavier reinforcements is not the answer because such bumpers cannot effectively yield on impact. An elastomeric bumper would have a much better capability of absorbing the collision energy because of the elastomer's inherent resiliency. Various elastomeric bumpers have been disclosed in the art. Thus, U.S. Pat. No. 3,638,985, for example, describes an arcuate, resiliently deformable bumper, which has web means in the shape of a grid projecting inwardly. Such a bumper, made of a high quality elastomer, is said to be able to absorb a large amount of energy.

French patent 2,089,868 (to Saab-Scania Ab), discloses a modular elastomeric automobile bumper component in the shape of a substantially rectangular hollow block divided into smaller, substantially rectangular compartments by means of portions intersecting at right angles.

A commercially useful elastomeric energy-absorbing device should be made of an elastomer having the right mechanical properties within the expected operating temperature range. The device must satisfy size and weight limitations usually imposed by vehicle or other equipment manufacturers as well as any existing or proposed government performance standards. The question then becomes twofold: how to achieve the desired goal in the most economical manner (using the least amount of elastomer), and how to distribute most effectively a given amount of rubber.

SUMMARY OF THE INVENTION

According to the present invention, there is now provided an energy-absorbing member especially useful as a vehicle bumper, for example, an automobile bumper, or a component thereof. This member is formed of an elastomer composition having a tangent modulus of elasticity at 20°C. of about 3000–60,000 psi and shaped into one or more sinuous ribs. The ribs, acting as short columns, are capable of buckling under impact in the direction of the rib length to modulate the impact force.

It is necessary for the present invention that the width (span) of the rib be at least one and one-half full periods, as determined along the axis passing halfway between the crests on opposite sides of the curvature.

BRIEF DESCRIPTION OF THE DRAWINGS

FIG. 8 is a schematic drawing of a three-rib module of the present invention; FIG. 9 is a schematic drawing of a module of the type described in French Patent 2,089,868; and FIG. 10 is a graphic representation of the relationship between specific energy and deflection on impact of these two modules.

DETAILED DESCRIPTION OF THE INVENTION

As used herein, the term "rib" means a compressive member with an unsupported length greater thhan five times and less than 100 times its least transverse dimension.

Figure 1:
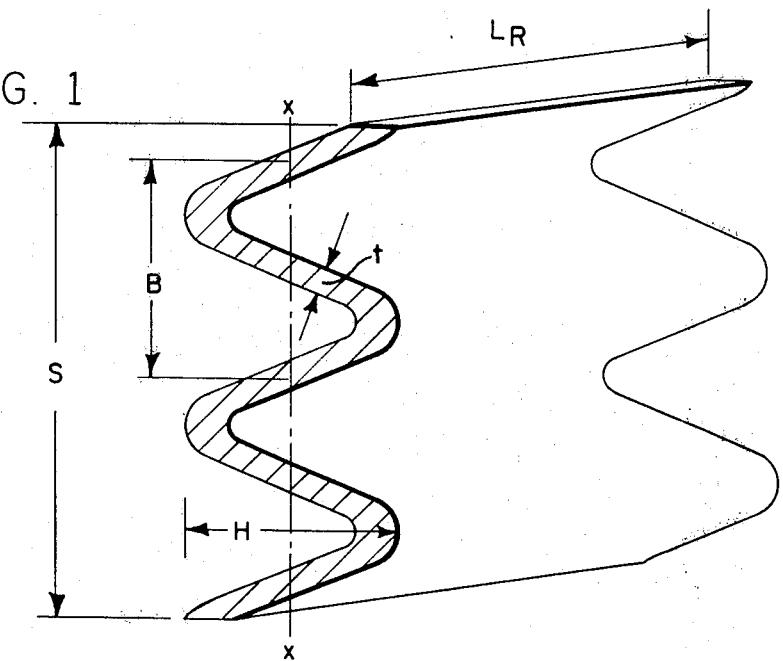
FIG. 1 shows a section of a sinuous rib.

FIG. 1 shows a perspective view of a rib within the scope of the present invention. The reference characters in that figure have the following meanings and preferred values:

$t$ = the rib thickness, 0.05–0.75 in.;
$B$ = period, 0.2–5 in.;
$S$ = span, 0.3–60 in.;
$L_R$ = length $5 < {}^L R/t < 100$;
$H$ = maximum height of the sinuous rib, 0.2–3 in.

$x—X$ is the axis passing halfway between the crests on the opposite sides of the curve.

Figure 2:
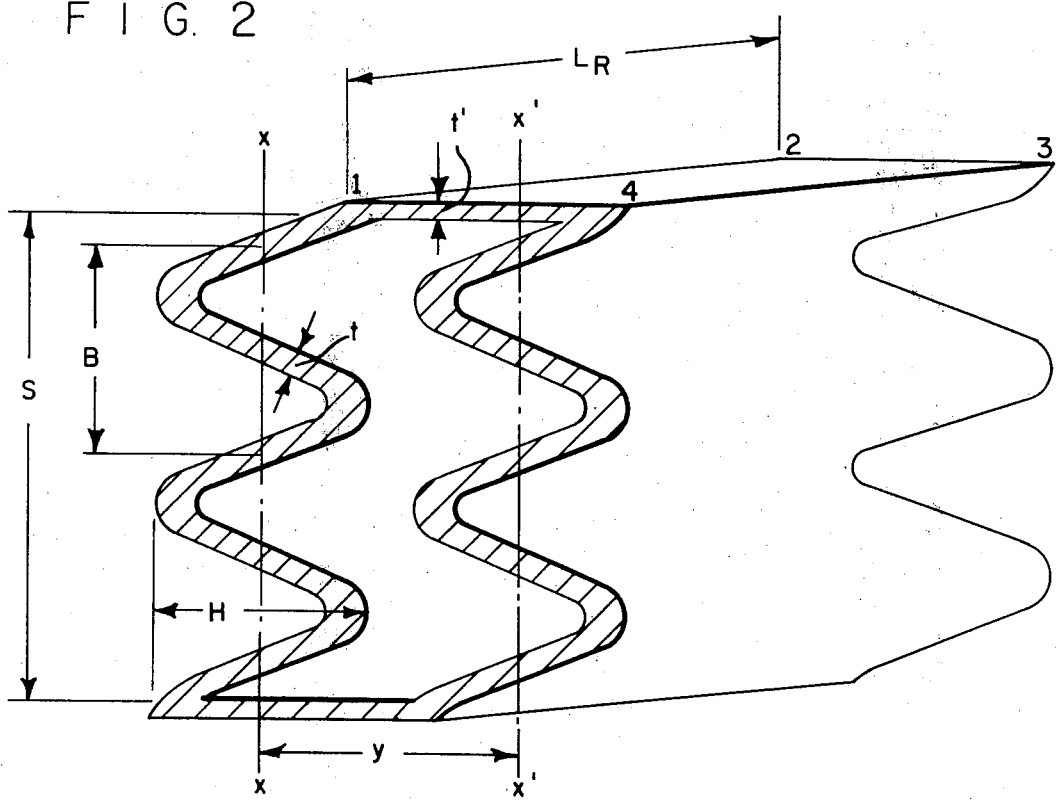
FIG. 2 shows a modular device composed of two sinuous ribs of the present invention.

An individual module of two ribs is shown in perspective in FIG. 2. The reference characters in FIG. 2 have the same meaning as in FIG. 1 and the same preferred values. In addition, $t'$ is the thickness of the connecting, supporting walls, 0.05–0.75 in.; and $x—x$ and $x'—x'$ are the respective axes of each rib, $y$ being the distance between those axes. The ration $^L R/y$ normally should be at least about 1 and at most about 3, preferably about 2.

Figure 3:
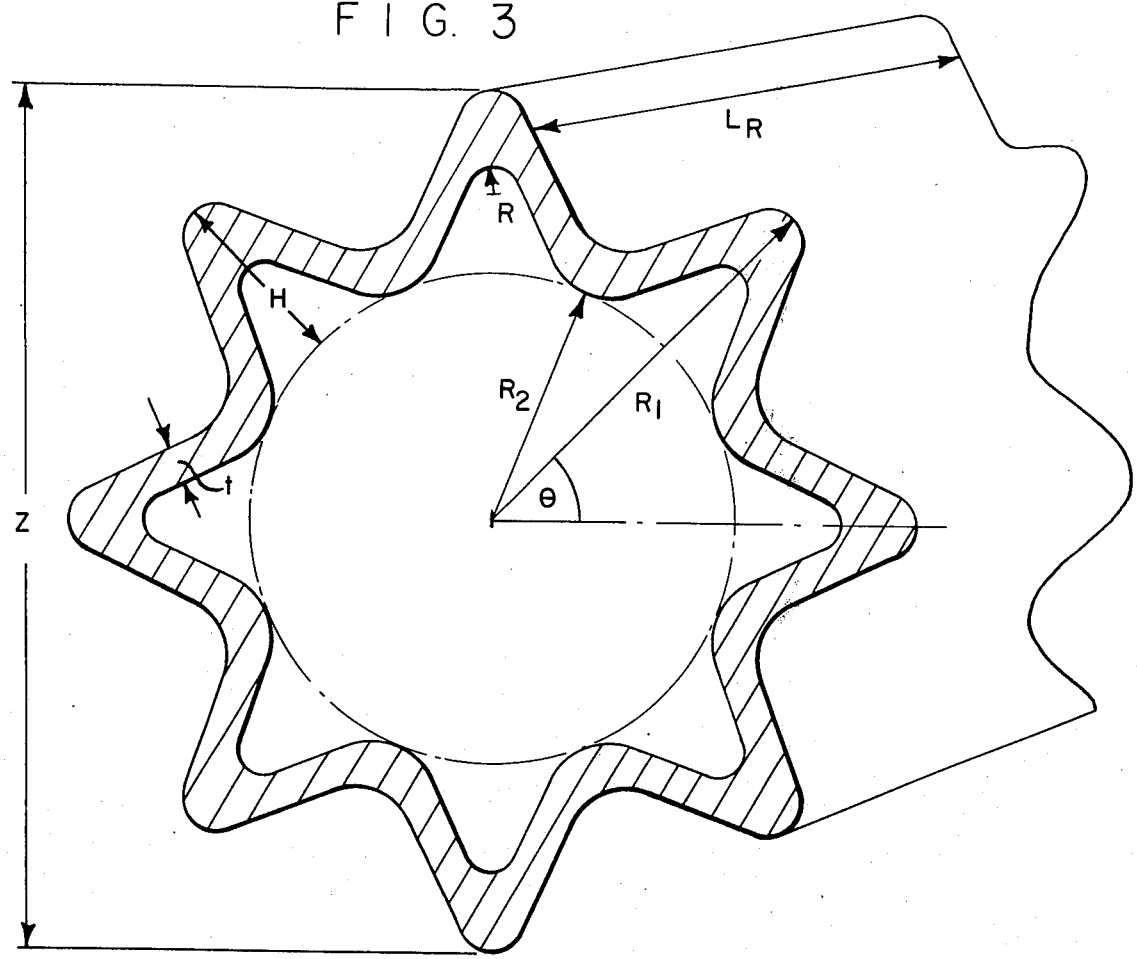
FIG. 3 shows a closed configuration of an elastomeric rib of the present invention.

As another possible configuration of the elastomeric ribs within the scope of the present invention, one can design a "continuous" rib, which can be obtained by bending a rib of sufficient span so that the ends of the span meet, as shown, for example, in FIG. 3. This design has an advantage over other modular designs in that it is capable of standing by itself, not requiring a connecting or supporting member. Various shapes can be obtained in this manner, including the star shape of FIG. 3, which has a circular axis, or other shapes where the axis is rectangular, triangular, trapezoidal, elliptical, or irregular. In a continuous rib, the rib axis is joined end to end on itself. In FIG. 3, R is the peak radius, which typically should be at least 0.25 inch; $R_1$ is the radius of the circumscribed circle, $R_2$ is the radius of the inscribed circle; and $\theta$ is the angle between peaks (which must be no more than 90°). The rib height H is normally 1–3 inches. $Z = 2R_1$ and is 3–10 inches. The thickness, $t$, is 0.175–0.75 inch; $L_R$ is the length of the rib; $L_R/t$ must not be smaller than 5.

The cross-section of a rib of the present invention usually will be uniform, so that, for example, the cross-hatched area in FIG. 1 will be the same as the corresponding area at the other end. Yet, it sometimes may be more practical for the ease of fabrication by extrusion or injection-molding to provide slightly tapered ribs, that is, ribs in which the cross-hatched area in FIG. 1 and its corresponding area at the other end of the rib are of slightly different dimensions. Such ribs also are contemplated by the present invention.

The term "sinuous", as used throughout this disclosure, is intended to cover both the corrugated (wavy of serpentine) shape and a zigzag shape having a 90° angle (sawtooth shape) in which the apices are rounded. Their performance data are very close to each other.

Figure 4:
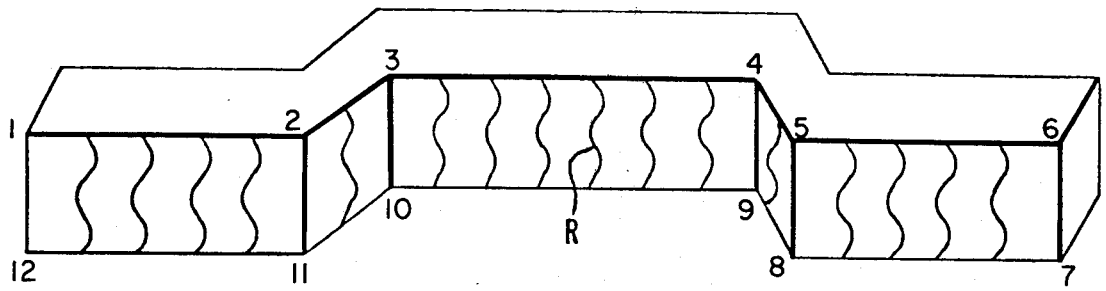
FIG. 4 is a schematic drawing of an energy-absorption device of the present invention.

FIG. 4 is a schematic representation of an effective arrangement of sinuous ribs of the present invention is an automobile bumper. The portion bounded by points 1, 2, 3, 4, 5, 6, 7, 8, 9, 10, 11, and 12, is the rear portion, which attaches to the body of an automobile. The elastomeric ribs are shown schematically as the wavy lines R; they are supported by connecting members on the top and on the bottom but may have both ends free. In this drawing, the impact force is directed from behind the sheet, toward the observer.

Figure 5:
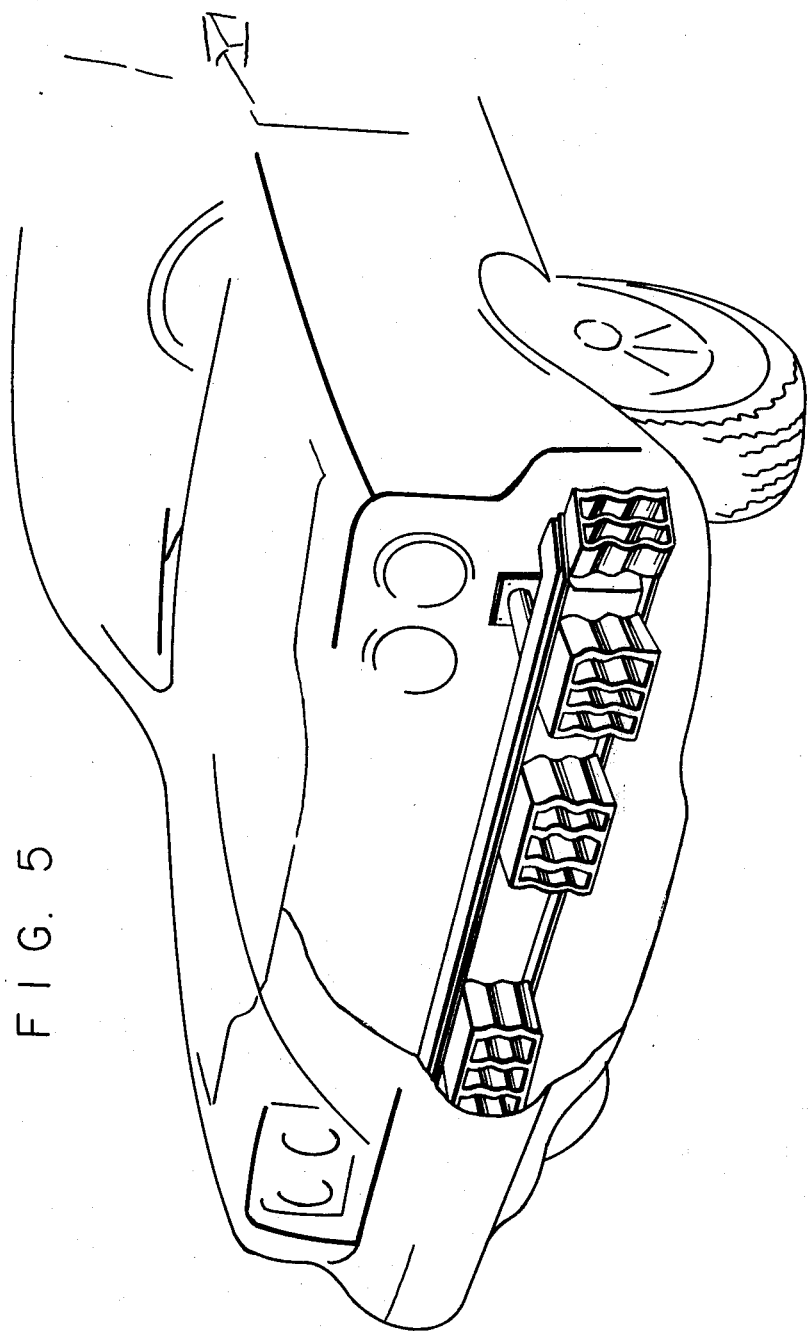
FIG. 5 shows schematically a typical arrangement of modular devices of the present invention.

Although energy-absorption devices of the type illustrated in FIG. 4 perform very satisfactorily, for practical reasons, the elastomeric ribs will normally be arranged into two or more modules, which then can be placed in the most effective manner to protect a structure from impact. A typical arrangement of such modules is shown in FIG. 5, which represents the front section of an automobile broken in part to show energy-absorbing elastomeric modules placed along the front and at the front corners of the automobile. These modules may be hidden behind a cover as shown in the drawing. This cover may be made of any suitable material, such as, for example, elastomer, plastic, or metal.

Any rib, horizontal or vertical, becomes unstable and buckles in the direction normal to the applied load when the compressive force exceeds a certain minimum or critical value. During the ensuing collapse, the rib continues to exert a resistive force that is substantially equal to the buckling force and is nearly constant for a considerable portion of its deflection, typically 50–70% of an elastomer rib's total length. Multiple ribbed units can be considered for design purposes as the summation of "$n$" similar or independent units, provided the force distribution on them is an axial, non-eccentric load. To ensure that the system remains within a substantially constant force mode of operation after buckling, and to minimize the possibility of rapid force buildup during collapse, a compressive strain ratio of $$\frac{2}{\pi} \simeq 0.64$$

is considered to be a conservation design limit for the allowable deflection of a buckled, sinuous, ribbed configuration under load. This strain ratio is the ratio of allowable rib deflection, $D_B$, to total rib length, $L_R$, i.e., $$L_R, \text{ i.e., } \frac{D_B}{L_R} \simeq \frac{2}{\pi}.$$

The rib shape is best described as sinuous, corrugated, wavy, or serpentine.

Figure 6:
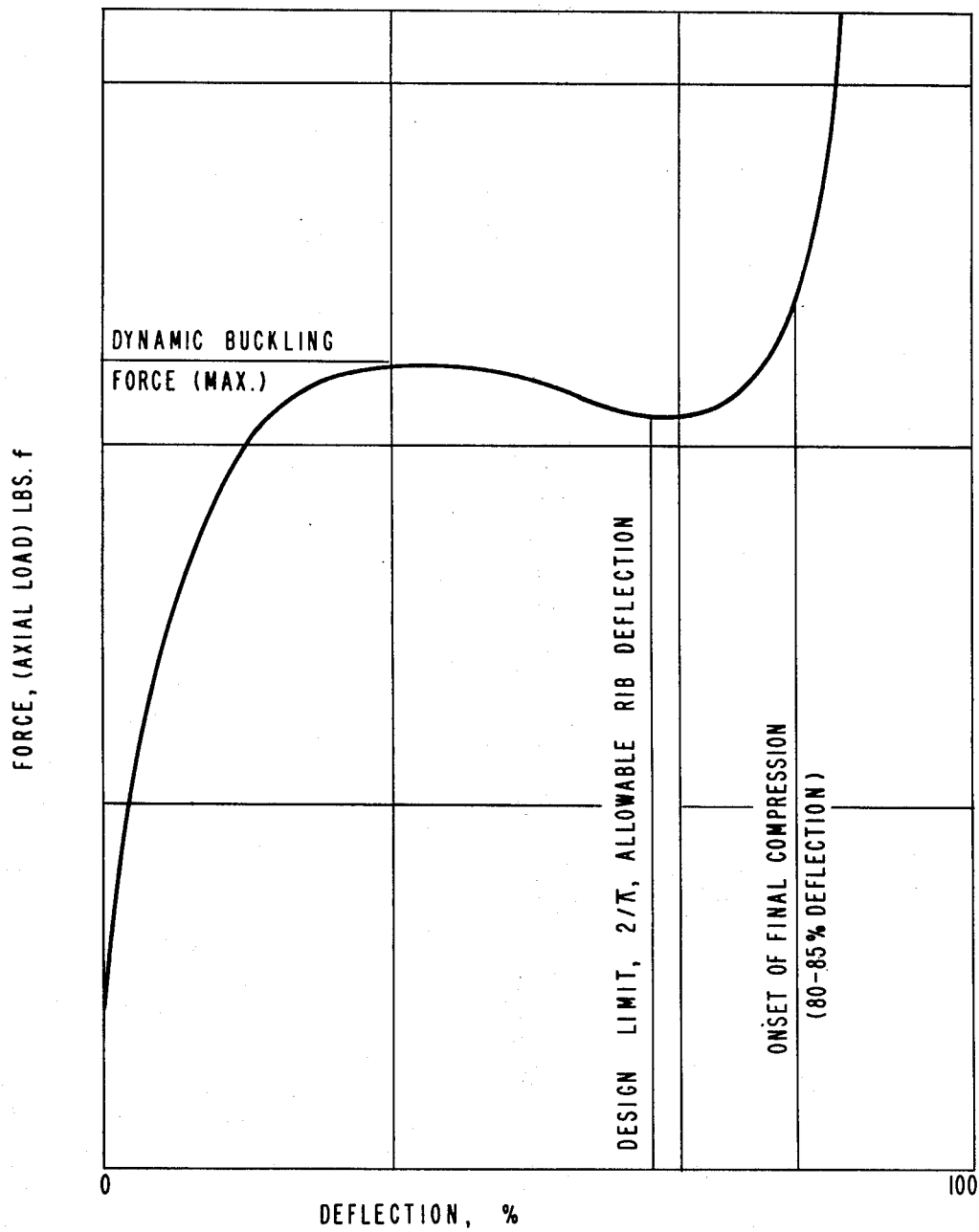
FIG. 6 is a typical force/deflection curve for a sinuous elastomer rib.

Referring to FIG. 6, which represents the force/deflection relationship, the experimental design limit is selected within safe distance from the onset of the final column compression. For example, for a total length of the rib of 3 inches, the design limit will be 3 × 0.64 or abouot 1.9 inches. The onset of final compression occurs at about 80–85% deflection. For a total length of 3 inches, this would be about 2.5 inches.

The common equation used to describe the critical load which will cause a long column to buckle (critical buckling force) is Euler's column equation (1):

$$F_B = \frac{C' \pi^2 (M)_E I_T}{L_R^2} \tag{1}$$

where $F_B$ = critical buckling force, lbs.;

$C'$ = a constant depending on the end constraint (in this specification, taken as 1/4, whether a rib is attached to a connecting member at one end and free at the other end or unattached at both ends;

$(M)_E$ = modulus of elasticity at 20°C., psi;

$I_T$ = moment of inertia of the column, in.$^4$; and $L_R$ = column length, in.

A rib may be considered to be a short column.

The buckling stress on a column can be calculated as follows:

$$S'_B = \frac{F_B}{A} = \frac{C' \pi^2 (M)_E I_T}{L_R^2 A}, \text{ lbs./in.}^2 \tag{2}$$

where $S'_B$ is the critical buckling stress, and A is the cross-section area of the column in in.$^2$ It is known from engineering handbooks that the least radius of gyration $r = \sqrt{I/A}$. Substituting this equation into Equation (2), one obtains $$S'_B = \frac{C' \pi^2 (M)_E}{\left(\frac{L_R}{r}\right)^2} \tag{3}$$

where $L_R/r$ is the slenderness ratio of the column. It is important to note that, while the Euler equation (1) may not be applicable to short columns (or ribs) ($L_R/r$ <100), for a column of a given slenderness ratio, whether long or short, whatever its shape, one would expect that the critical buckling force per unit area, $F_B$, will remain constant.

In fact, it has now been found experimentally that is not constant but varies according to the shape of a rib for a given slenderness ratio.

Figure 7:
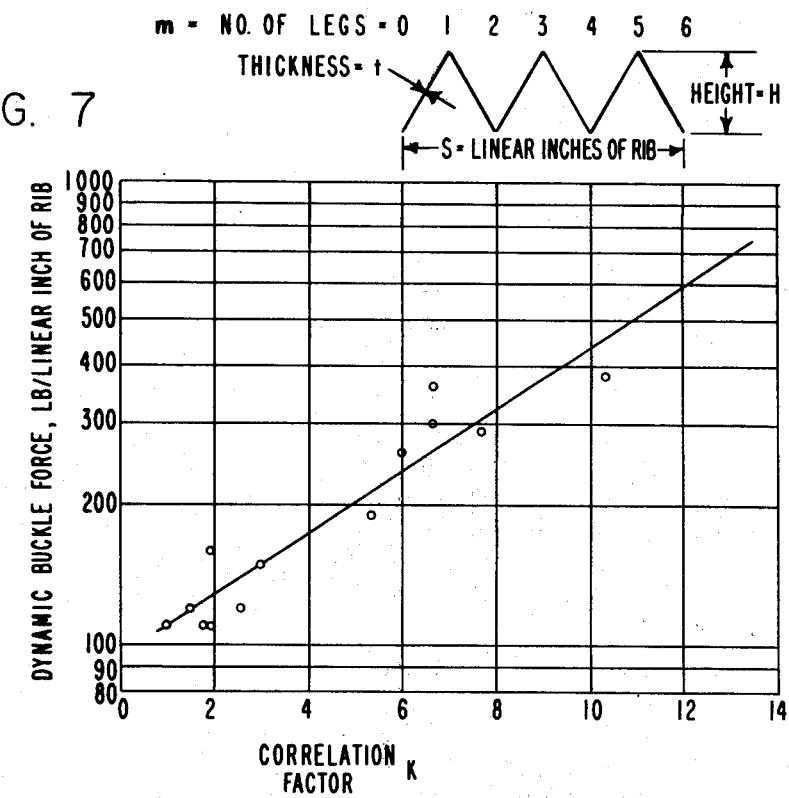
FIG. 7 is a graphic representation of the relationship between the buckling load and a factor K which depends on the geometry of an elastomeric rib.

Experimental data show that elastomeric sinuous ribs absorb energy very effectively. Taking for simplicity a sawtooth shape, which differs from the serpentine shape mainly in having sharp rather than rounded corners, one can experimentally obtain the curve represented in FIG. 7. The following experimental procedure was used:

Vertically standing serpentine ribs differing only by their number of legs, $m$, were impacted at 5 miles per hour by a freely falling weight of about 200 lbs. in a specially built drop-weight tester. The force transmitted by the rib during impact was recorded versus time. First peak values were recorded as buckling forces which were plotted against a correlation factor, K, as shown in FIG. 7. Data plotted in FIG. 7 were obtained for ribs made of Nordel 2903 hydrocarbon rubber having a modulus of elasticity of about 3500 psi. The straight line was interpolated by the least square method.

The correlation factor, K, was obtained from the Euler equation for a buckling column, $$K = \frac{16.375 \, m t H^3}{L_R^2}.$$

The number of legs of the curve, $m$, is related to the curve's period by the relationship: 2 legs form 1 period, B. $L_R$ is the length of the rib as defined above. In this case, where $m$ is the only variable in K, the Euler equation would predict that the plot would be a straight line parallel to the abscissa. However, a deviation is observed here, which is both unexpected and useful for design calculations. It can be seen from this curve that the sinuous design is capable of absorbing more impact per given rib span than can be expected from classic calculations.

Subsequent data added deflection versus time, and from thence plots were made of force versus deflection as well as the energy absorbed by the buckling rib; that is, the integral of force times displacement up to the point of maximum deflection.

It will be observed that the structures represented in FIGS. 2 and 4 contain in a addition to the sinuous ribs, also supporting or connecting walls or members. The outer surface of such a connecting member is shown as area 1, 2, 3, 4 in FIG. 2. Such structures can be conveniently fabricated in one operation from the same elastomers as integral units. Yet, in above calculations, the effect of such supporting or connecting members normally is ignored for simplicity. The presence of such members would increase the amount of energy absorbed by the unit above that calculated for the sinuous rib alone.

The energy absorbed by an elastomeric, curved-rib device of the present invention can be calculated from the following equation:

$$E_A = F_{Max} \times D_{Max} \times n, \text{ in. -lbs.} \tag{4},$$

where $F_{Max}$ is the maximum force which the device can absorb; $D_{Max}$ is the maximum allowable rib deflection; and $n$ is a curve shape factor (efficiency), which can be determined experimentally. The value of n can be assumed to be about 0.6, a dimensionless fraction in designing sinuous rib absorbers. $E_A$ can also be calculated as an integral of $F \times D$ between the limits O and maximum deformation.

For a given energy to be absorbed, one can choose either the desired force level or the desired deflection, but not both. Normally, the automobile manufacturer will specify either $F_{Max}$ or $D_{Max}$. The shape factor, $n$, appears to be a function of the geometry of the structure. It will be seen from Example 2, below, that different shape factors give different energy absorption capabilities per weight of elastomer.

The construction of an energy-absorbing device of this invention may be of integral type or a modular type, as shown above. A module may comprise, for example, a composite structure in which a number of sinuous ribs are connected on the top and bottom to a supporting member, both ends being free. Any material that has sufficient impact strength and weather resistance can be used for the outside casing of the device, for example, rubber, steel, glass fiber composites, or a nylon resin. The actual energy-absorbing, curved rib structure must be made of a material that has sufficient resiliency to recover after impact. Suitable materials are elastomers having a tangent modulus of elasticity within the range of about 3000 to 60,000 or more psi at room temperature. Below the lower limit, too much rubber is required to control the impact within reasonable cost, force, and deflection limits. Above the higher limit, there is danger of vehicle breakage because of increasing lack of elasticity.

A suitable elastomeric material that can be used in the energy-conversion devices of the present invention is, for example, an ethylene/propylene/1,4-hexadiene terpolymer composition commercially available as Nordel 2903 (E. I. du Pont de Nemours and Company, Inc.). This material is available as a compound having Mooney viscosity MS 1+4 at 250°F. of 34–46. When cured, it has a 100% modullus of 900 psi minimum, tensile strength of 2000 psi minimum, elongation of 200% minimum, and a tangent modulus of elasticity of about 3500. For integral construction devices, this material offers an additional advantage since it can be painted to match any automobile color.

Other suitable elastomer compositions may be based on conventional, curable rubber compounds which usually are carbon black-filled and oil-extended; fiber-reinforced elastomers, including glass fiber, graphite, and other inorganic fibers, as well as cellulosic fibers, such as viscose and cellulose acetate and aramid fibers or other organic fibers; elastomers filled with thermoplastic or thermosetting resins; blends of elastomers with thermoplastic materials; and foamed compositions including polyurethanes, filled and unfilled elastomer compositions as those listed above, and thermoplastic materials. Foaming techniques are well known in the art and include expanding an uncured material in the presence of blowing agents or of a gas such as air or nitrogen introduced under pressure, and curing the expanded material.

Any elastomeric composition can be used provided its modulus of elasticity is within the specified range. The chemical composition of the elastomer is not important, except that the material should be able to perform well in hot as well as in cold weather, in highly humid as well as in a very dry atmosphere.

Various energy-absorption devices can be designed according to the present invention to fit any specific manufacturer's requirements and tolerances. Such devices may be used as automobile bumpers or as energy-absorbing modules for mechanical equipment of any kind. The overall appearance of any such device may differ considerably from the appended drawings, but all these devices will have as at least one of their energy-absorbing elements an elastomeric sinuous rib structure.

This invention is now illustrated by the following, representative examples.

EXAMPLE 1

A single rib energy-absorbing device such as illustrated in FIG. 2 has the following dimensions:

$t = 0.25$ inch
$L_R = 4.0$ inch
$S = 4.5$ inch
$H = 1.25$ inch
$B = 1.8$ inch

If this structure is constructed from an elastomer with a tangent modulus of elasticity of 3000–4000 psi, such as Nordel 2903, the buckling force can be calculated from the plot in FIG. 7. The correlation factor, K, based on the geometry of the rib, is found to be 2.5 The dynamic buckling force is found from the plot to be 140 lbs. per linear inch of the rib or about 630 psi per rib having a span of 4.5 inches. The energy which the rib can absorb on buckling can now be calculated from equation (4) (assuming $n = 0.6$ and $D_B = 0.66\ L_R$) to be 1000 in.-lbs.

EXAMPLE 2

Figure 8:
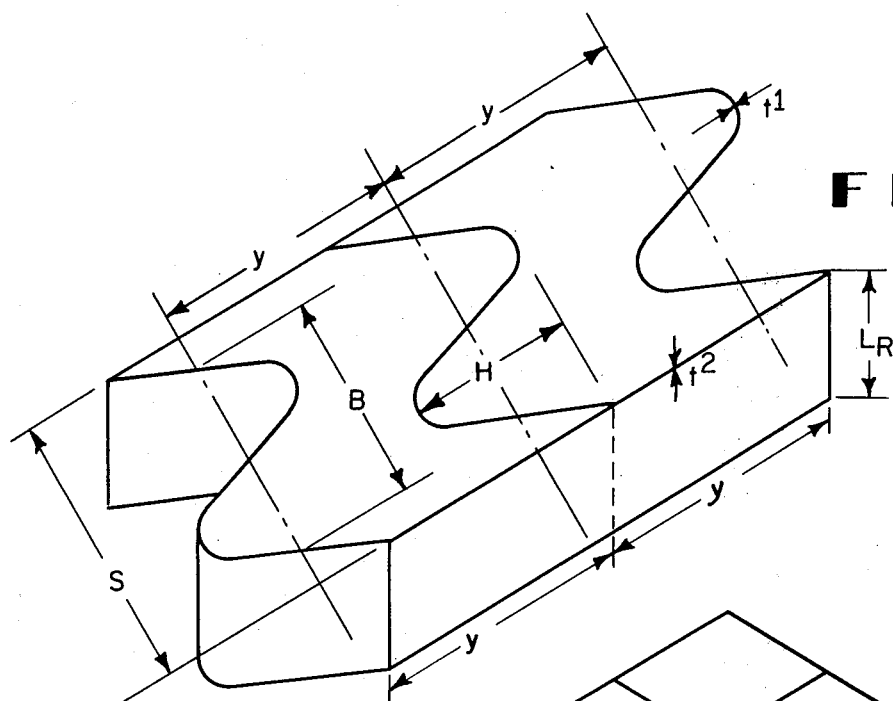
FIGS. 8–10 are provided for better understanding of Example 2, below.

An energy-absorbing module was prepared from Nordel 2903 hydrocarbon rubber by molding and curing it into a module containing three parallel sinuous ribs, as shown in FIG. 8 (where $t^1 = 0.28$ in., $B = 1.53$ in., $S = 2.25$ in., $H = 1.375$ in., $L_R = 3.69$ in., $y = 2.75$ in., and $t^2 = 0.375$ in.). The cured rubber had a tangent modulus of elasticity of 3500.

Figure 10:
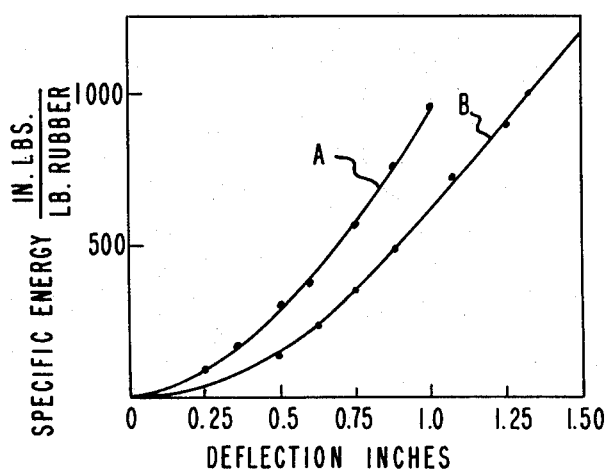

The module was placed in a U-beam holder in a "drop-weight" test apparatus where the module projected 1.9 in. above the arms of the U-beam. The tester was instrumented to electronically record a force-deflection curve for the test piece. The module was subjected to impact by a falling weight of 250 lbs. (dropped from heights of 4–10 in.) at a test temperature of 21.1°C. and a force-deflection curve was obtained. The force-deflection curve was integrated to generate an energy vs. deflection curve, and points on this curve were divided by the weight of the module (1.312 lb.) to generate the specific energy vs. deflection curve shown as curve A in FIG. 10.

Figure 9:
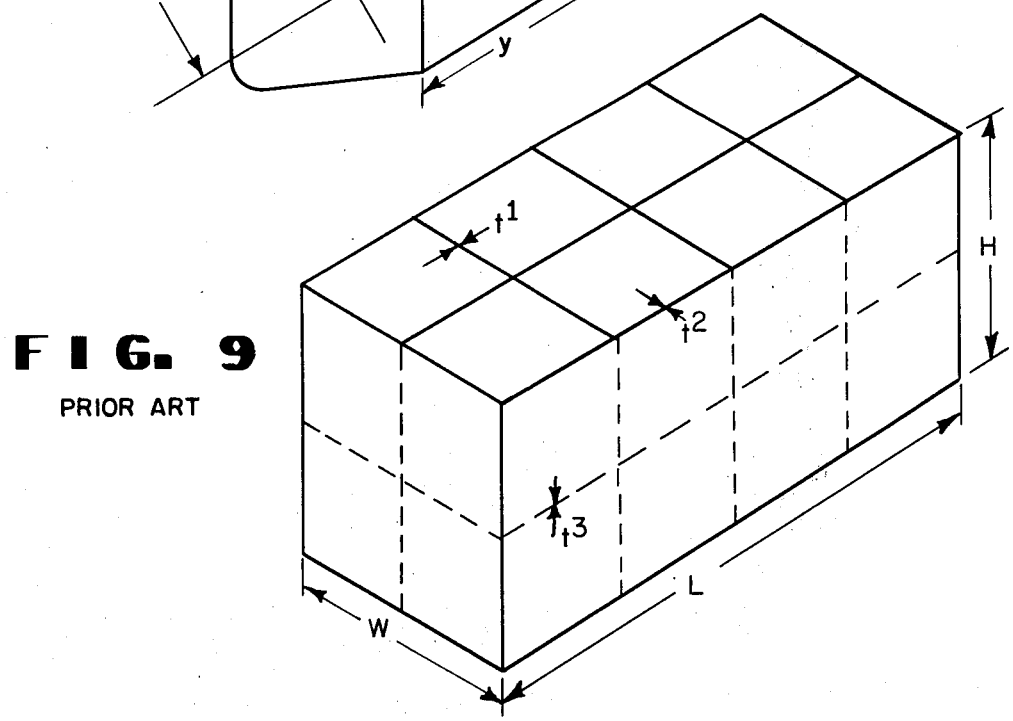

For comparison, a box-rib energy-absorbing module, similar to that described in French Patent 2,089,868, was prepared from Nordel 2903 hydrocarbon rubber in the shape shown in FIG. 9. It thus differed from the module above only in its shape and its total weight, which was 1.008 lbs. This module had the following dimensions: length, L, 7.375 in.; width, W, 3 in.; height, H, 3,688 in. A reinforcing rib having its plane perpendicular to all inner partitions was placed at about one-half of the module's height, as shown by a broken line parallel to L and to W. The thicknesses of the various module elements were: $t^1 = 0.125$ in.; $t^2 = 0.156$ in.; $t^3 = 0.063$ in. The "drop-weight" test described above was used to generate the specific energy vs. deflection curve shown as curve B in FIG. 10.

It can be seen from these results that a module of this invention, which incorporates elastomeric, sinuous ribs, is capable of absorbing considerably more energy per unit weigth of rubber per unit deflection than a module of prior art design. This advantage is particularly useful in automotive applications where it is desired to keep the weight and deflection to a minimum.

We claim:

1. An energy-absorbing member formed of an elastomeric composition having a tangent modulus of elasticity at 20°C. of about 3,000–60,000 psi and shaped into at least one sinuous rib, the span of the rib being at least one and one-half full periods as determined along the axis passing half-way between the crests on opposite sides of the curve, and its length being at least five times but not more than one hundred times its thickness; said rib being capable of buckling under the force component of impact in the direction of its length.

2. A member of claim 1 in which each rib has a thickness of about 0.05–0.75 inch; a period of about 0.2–5 inches; a span of about 0.3–60 inches; and a maximum height of about 0.2–3 inches.

3. A member of claim 1 which is shaped into a module consiting of a plurality of ribs having substantially parallel axes supported by at least one connecting member.

4. A member of claim 3 wherein the ribs and the connecting member are made of the same material as a one-piece integrated construction.

5. A member of claim 4 wherein both end surfaces of the length dimension ($L_R$) of the ribs are free.

6. An energy-absorbing member of claim 4 which is placed between the body of an automobile and an outer member in such a manner that said energy-absorbing member together with said outer member form an automobile bumper.

7. A member of claim 1 which is formed into a rib having the axis joined on itself.

8. A energy-absorbing member of claim 7 which is placed between the body of an automobile and an outer member in such a manner that said energy-absorbing member together with said outer member form an automobile bumper.

9. A member of claim 1 made of a terpolymer of ethylene, propylene, and 1,4-hexadiene.

10. A member of claim 1 made of a glass fiber-reinforced elastomer composition.

11. A member of claim 1 made of a formed elastomer composition.

12. A member of claim 1 wherein the rib is attached along one of the end surfaces of its length dimension to a connecting member, and the end surface at the other end is free.

* * * * *